United States Patent
Schwartz et al.

[19]

[11] Patent Number: 6,007,123
[45] Date of Patent: Dec. 28, 1999

[54] ENERGY ABSORBING BUMPER

[75] Inventors: Robert Schwartz, Ann Arbor; Regu Ramoo, Troy, both of Mich.

[73] Assignee: Altair Engineering, Inc., Troy, Mich.

[21] Appl. No.: 08/898,772

[22] Filed: Jul. 23, 1997

Related U.S. Application Data

[60] Provisional application No. 60/022,357, Jul. 24, 1996.

[51] Int. Cl.$^6$ .................................................. B60R 19/26
[52] U.S. Cl. .......................... 293/132; 293/124; 293/136; 293/137; 293/134
[58] Field of Search ..................................... 293/107, 109, 293/110, 120, 124, 131, 132, 135, 136, 137, 134

[56] References Cited

U.S. PATENT DOCUMENTS

| | | |
|---|---|---|
| 1,497,653 | 6/1924 | Coote . |
| 1,622,442 | 3/1927 | Guenther et al. ................. 293/120 X |
| 1,626,347 | 4/1927 | Lyon . |
| 1,848,851 | 3/1932 | Thomas . |
| 2,508,836 | 5/1950 | Morris ..................................... 293/135 |
| 2,593,586 | 4/1952 | Maag ....................................... 293/137 |
| 2,792,250 | 5/1957 | Klingensmith et al. ................. 293/134 |
| 3,311,397 | 3/1967 | Ramsey ..................................... 293/84 |
| 3,823,968 | 7/1974 | Barenyi ..................................... 293/84 |
| 3,850,466 | 11/1974 | Yeais ........................................ 293/89 |
| 3,877,741 | 4/1975 | Wilfert et al. ............................ 293/89 |
| 4,533,166 | 8/1985 | Stokes ..................................... 293/120 |
| 4,671,550 | 6/1987 | Molnar ..................................... 293/120 |
| 4,714,287 | 12/1989 | Merkle ..................................... 293/102 |
| 4,786,459 | 11/1988 | Mundo ..................................... 293/132 |
| 4,961,603 | 10/1990 | Carpenter et al. ....................... 293/102 |
| 5,139,297 | 8/1992 | Carpenter et al. ....................... 293/132 |
| 5,269,574 | 12/1993 | Bhutani et al. ......................... 293/102 |

FOREIGN PATENT DOCUMENTS

WO9014972  12/1990  WIPO .

*Primary Examiner*—D. Glenn Dayoan
*Assistant Examiner*—Jason Morrow
*Attorney, Agent, or Firm*—Young & Basile, P.C.

[57] ABSTRACT

An energy absorbing bumper that dissipates kinetic energy of a moving mass via conversion to compressive membrane energy stored in a primary beam-column, potential energy stored in two laterally mounted energy absorbers and bending energy stored in a secondary beam-column. During impact the primary beam-column is laterally compressed as it flattens developing a large amount of compressive membrane energy. During deformation, the primary beam-column slides into the secondary beam-column having a central channel that accommodates the primary beam-column.

8 Claims, 5 Drawing Sheets

ENERGY ABSORBING BUMPER

This application claims benefit of Prov. Application No. 60/022,357, filed Jul. 24, 1996.

FIELD OF THE INVENTION

The invention relates to bumper systems for vehicles, in particular, bumper systems utilizing lateral energy absorbing components.

BACKGROUND OF THE INVENTION

Current impact beams for automotive bumpers and side intrusion beams are configured such that when the impact beam is subjected to a direct impact, the kinetic energy is dissipated by the work of displacing the beam inwardly with respect to the supporting structure. In the process, kinetic energy is converted to strain energy in the resisting member. Depending on the end fixation conditions, some portion of the strain energy would be manifested as bending strain energy and the rest as membrane strain energy. Unless there is significant lateral rigidity of the end fixation or that the curvature of the beam is approaching that of an arch, which is rarely practical, the strain energy would be predominantly stored as bending strain energy. The amount of bending strain energy that can be dissipated is limited by the peak stress developed in the structure as the resisting force increases while mitigating the impact. If the impact beam is mounted with longitudinally positioned supplementary energy absorbers including hydraulic attenuators, absorptive foams, crush tubes or spring supports, then the impact beam would have to be designed to withstand at least the trigger loads of these devices.

One example, as disclosed in U.S. Pat. No. 5,269,574, includes a bumper of an 'I'-type configuration with a ribbed web to provide some torsional rigidity. During a central impact, the kinetic energy of the impact is converted to predominantly bending strain energy. The distribution of the bending strain energy along the span of the beam would be similar to the distribution of the bending moment on a simply supported beam. The peak stress occurs at the impact location and decreases gradually along the length to a smaller magnitude at the ends. Only a small central portion of the beam would be strained to the elastic limit while the rest of the span would be stressed to less than the limit.

An impact beam should be designed to maximize the work done in straining the beam to the elastic limit. The external work done is the product of the resisting force and the distance traversed while resisting the load. Internal to the beam this equates to the totality of strain energy stored in the beam which is the volumetric integral of the product of the average stress and strain. It is imperative to note that a beam designed to maximize static stiffness does not necessarily translate to one that mitigates maximum kinetic energy under impact.

Another example, as disclosed in U.S. Pat. No. 4,961,603 includes a curved bumper member with a rear tension means that are directly and pivotally connected. The tension member provides a means for relieving the longitudinally extending load members, to which the bumper is mounted, of the large lateral forces that would be developed when the curved beam is impacted. Depending on the actual sweep of the curve member, the bending moment distribution along the span could be at best maximum at the center and at the ends and varying gradually in between. During a central impact, the strain energy in the bumper will be stored as bending strain energy and membrane strain energy in the beam. Depending on the relative magnitude of the bending and the axial forces, the stress could be maximum at a small span where the bending moment is maximum or at the region where the axial force is approaching the critical buckling load of the beam.

U.S. Pat. No. 1,626,347 discloses a curved bumper in which the lateral forces are countered by the bracing action of a member extending across the rail at the point of attachment. Again, here the peak stress would be at the point where the peak bending moment occurs or where the axial force approaches the critical buckling load of the beam.

Admittedly both these designs could result in a much more uniform stress distribution as the sweep approaches that of an arch. This is a result of the membrane mode of energy storage dominating with larger sweeps. However these designs do not provide a means for controlling the large amounts of membrane energy developed in the curve beam. Curved beams with large sweeps generally have the tendency to buckle, which is essentially the process where the unstable membrane strain energy exceeding the stability threshold reverts to the more stable bending strain energy.

Optimally a beam designed for impact should be no stiffer than the surrounding structure and have as uniform a stress distribution over the span of the beam as practically feasible. In addition, for work to be done, the resistant force should traverse over as large a distance as possible or internal to the beam, the stress should be uniformly sustained over as large a span as possible. The load and the stress should be maintained as the beam deforms so that the ideal square energy pulse would be obtained as the kinetic energy of the impact is mitigated.

SUMMARY OF THE INVENTION

The intent of the invention is to address these aforementioned concerns. The invention comprises two embodiments utilizing lateral energy absorbing components. The first embodiment is an energy impact bumper beam having a primary impact beam column, preferably of a W, C or hat cross-section, and laterally mounted energy absorbers at each end of the primary impact bumper beam. The secondary bumper beam having end walls constrains the energy absorbers and forms a pocket for receiving portions of the primary impact bumper beam. The secondary beam generally has a lower sweep number than the primary beam and a size and shape to accommodate the primary beam as it is flattened out during impact. The sweep number defines the curvature of the bumper beam along its longitudinal axis. The higher the sweep number obtained, the smaller the radius of curvature for the bumper. During an impact, after the existing load exceeds the trigger load of the energy absorbers, the primary beam flattens out and slides into the central channel/pocket of the secondary beam. The primary impact beam and the secondary impact beam have heights chosen such that the primary beam can flatten out and slide into or over the secondary beam. This provides a longitudinal resisting force with the maximum transversable distance within the available pocket. The laterally mounted energy absorber may comprise any energy absorbing means such as hydraulic shocks, polymeric foam material, elastomeric material, elastic coil, sigma or Y-springs. The primary and secondary beams may be formed of metal, structural composites, plastic or any such combinations.

In the second embodiment, which is also the preferred embodiment, an arched bumper beam is connected to the vehicle body via frame rails by a mounting bracket proximate to each end of the bumper beam. Disposed between the two mounting brackets, is a supporting means in the form of a tension energy absorber which is externally mounted and held in place by a tension cable and located substantially on the same horizontal plane as the bumper beam. By disposing the tension energy absorber and tension cable on the same plane as the bumper beam, the tension energy absorber is protected such that opposite ends of the bumper beam may move through different distances without any binding action.

Using a bumper system with a laterally mounted energy absorber requires a specific energy absorber response. Due to the high mechanical advantage of an arched bumper beam, the lateral spreading force will be large, possibly higher than the axial impact force. It is necessary for the energy absorber to withstand these high lateral, tension loads. The overall bumper system performance is dependant upon the efficiency of the energy absorber. The most efficient energy absorber has a square wave force-deflection response, where the trigger load is immediately reached and this same load is maintained over the entire deflection. Tension energy absorbers that may be considered are hydraulic shocks using silicone, oil or other hydraulic fluid, pre-loaded springs or eccentric cam with cable.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 4b–4c are alternate configurations of the cross-sectional view as shown in FIG. 4a;

DESCRIPTION OF THE PREFERRED EMBODIMENT

Figure 1:
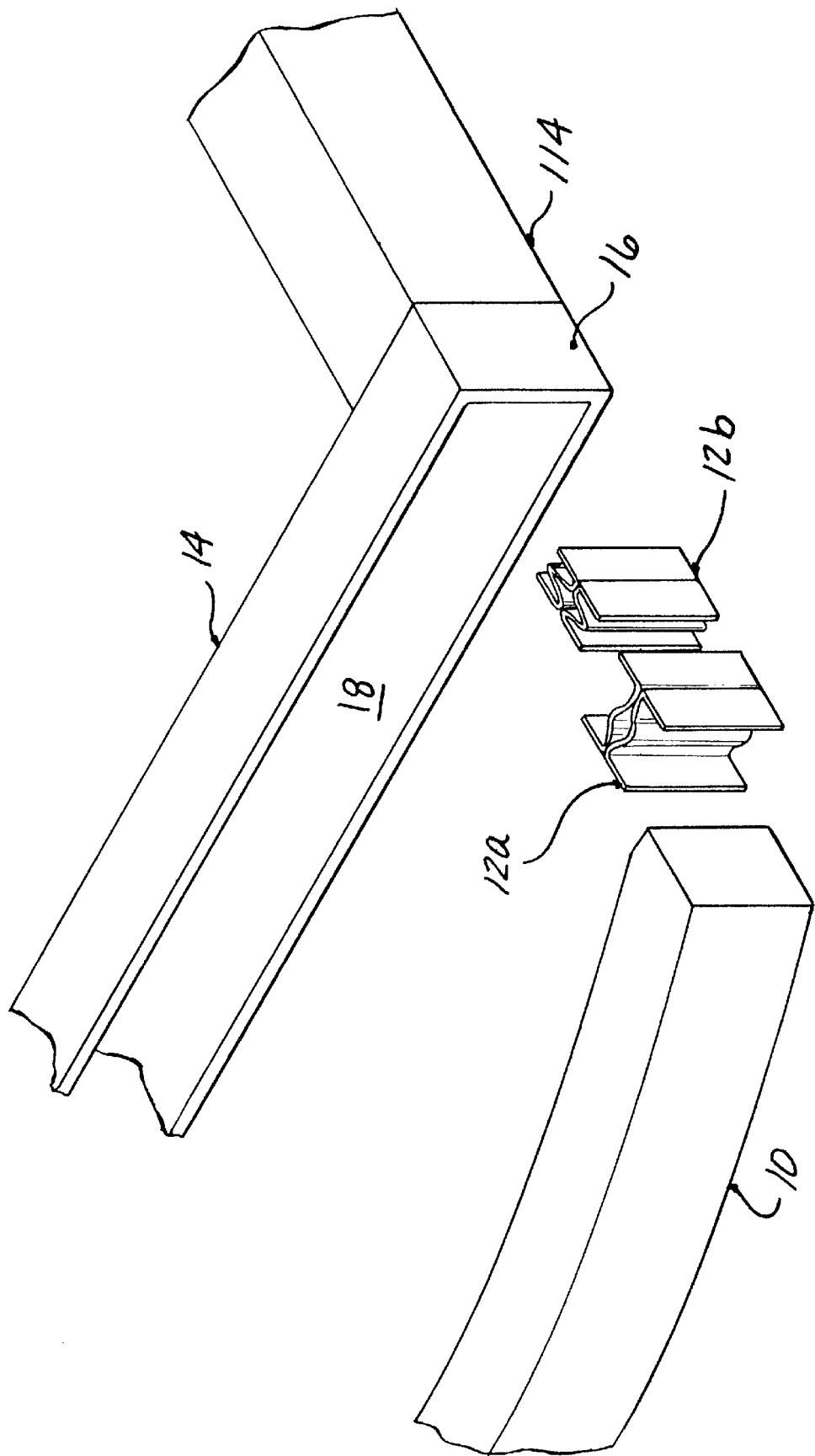
FIG. 1 is a perspective view of a bumper beam system as described in the first embodiment having a primary and secondary beam.
Figure 2:
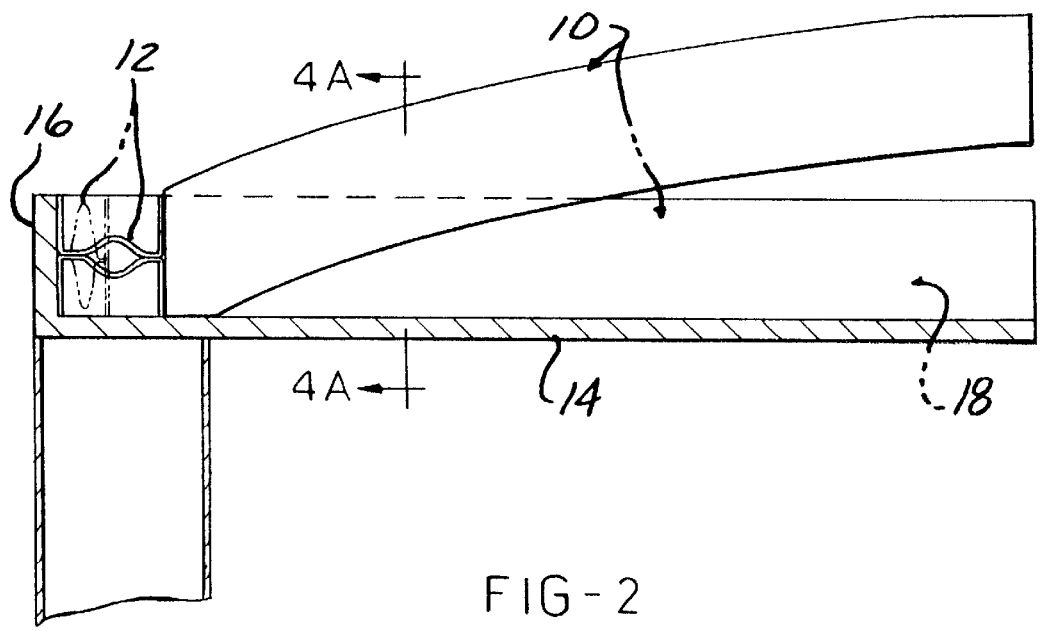
FIG. 2 is a plan view of an end portion of the bumper beam system shown in FIG. 1.
Figure 3F:
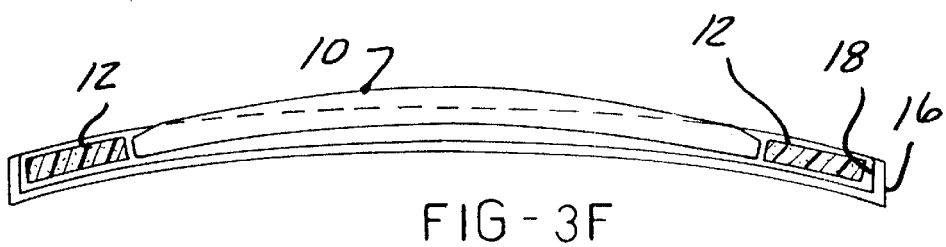
FIGS. 3A–3F show various energy absorbers considered for the first embodiment.
Figure 3A:
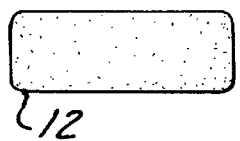
Figure 3B:
Figure 3C:
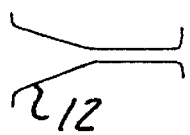
Figure 3D:
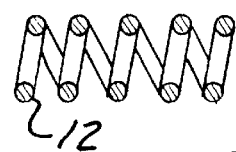
Figure 3E:
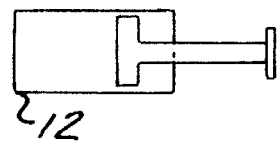

The energy impact bumper beam as shown in FIGS. 1 and 2 having a primary impact bumper 10 of a W, C or hat cross-section, and has laterally mounted energy absorber 12 at each end of the primary impact bumper beam 10 and a secondary bumper beam 14 having end walls 16 constraining the energy absorbers and forming a pocket 18 for receiving portions of the primary impact bumper beam. The secondary bumper beam would have a lower sweep than the primary bumper beam 10 and size and shape to accommodate the primary section 10 as it is flattened out during impact. During an impact, after the resisting load exceeds the trigger load of the energy absorbers 12, the primary beam flattens out and slides into the central channel pocket 18 of the secondary beam 14. In FIG. 1, element 12a is an energy absorber in preload conditions. Element 12b is the energy absorber when compressed.

Figure 4A:
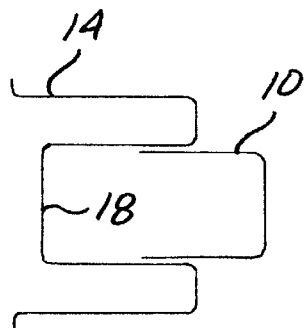
FIG. 4a is a portion of a cross-sectional view of the bumper beam system taken along lines 4a—4a in FIG. 2.
Figure 4B:
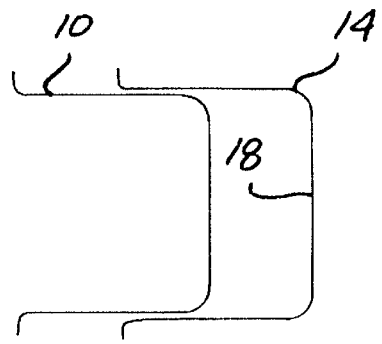
Figure 4C:
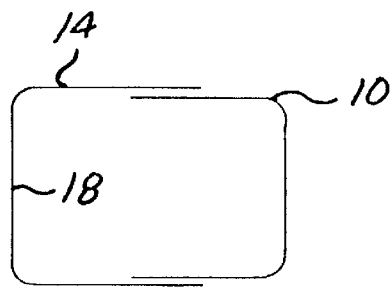

The primary impact beam 10 and the secondary impact beam 14 may be formed as a W, C or hat section, preferably as shown in FIG. 4a–c. However, the heights of each beam should be chosen such that the primary beam 10 can flatten out and slide into or over the secondary beam 14. This provides longitudinal resisting force within the maximum transversable distance within the available pocket 18. The laterally mounted energy absorbers 12 may comprise any energy absorbing means 12 such as shown in FIGS. 3A–E as elastomeric material 3A, multiple sigma springs 3B, 4-spring set 3C, coil springs 3D, hydraulic dash pot 3E or polymeric foam material 3F. The primary 10 and secondary beams 14 may be formed of materials consisting of metals, structural composites, plastics or any such combinations.

Figure 5:
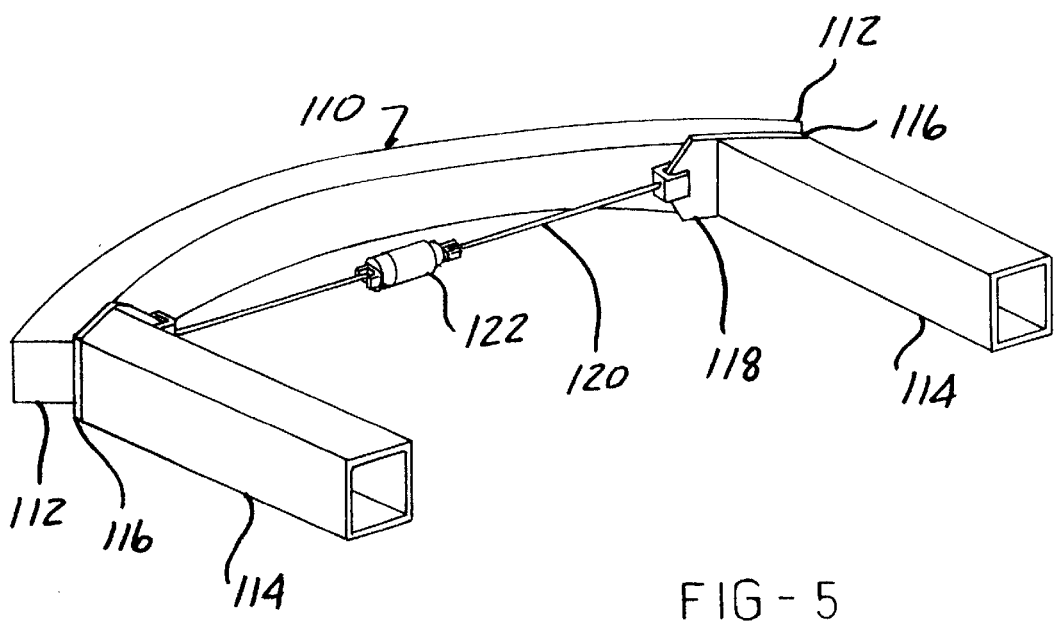
FIG. 5 is a perspective view of the bumper beam assembly as described in the second embodiment.
Figure 6:
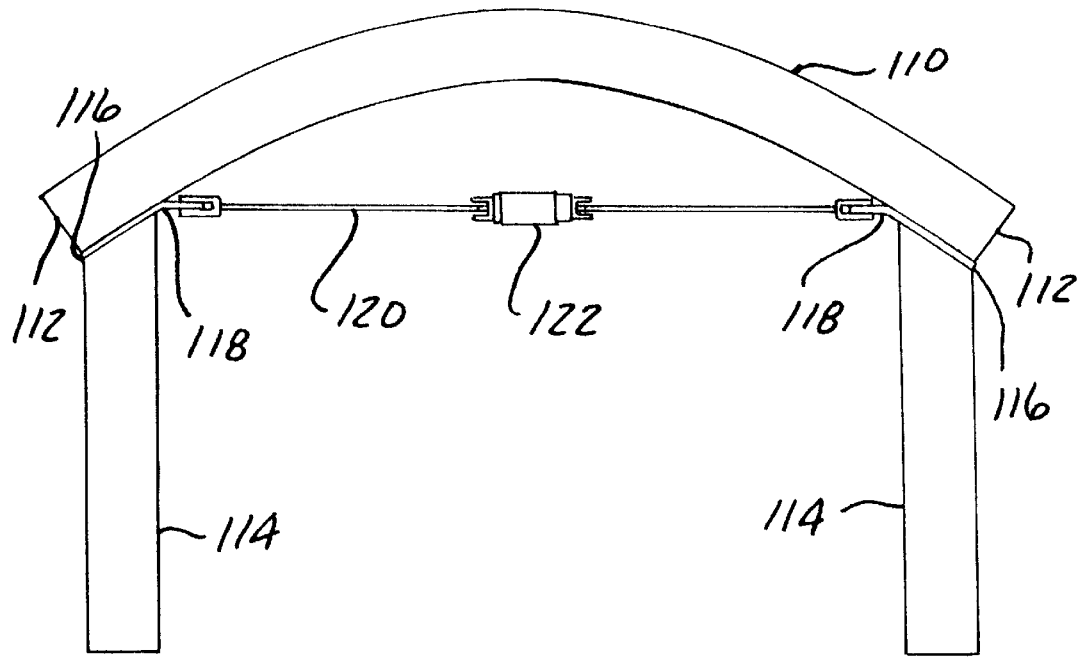
FIG. 6 is a plan view of the bumper beam assembly of FIG. 5.

In the second and preferred embodiment (FIGS. 5 and 6), a single high sweep primary bumper beam 110 is provided and secured proximate to its ends 112 to a pair of frame rails 114 that axially extend away from the bumper beam 110. The bumper beam 110 is attached to the frame rail 114 by a mounting bracket 116 disposed therebetween. Each mounting bracket 116 has lateral extending portions 118 projecting toward each other. At the innermost portion of each projecting portion 118 of the mounting bracket 116 is appropriate attachment means for a tension cable or tube 120. The cable/tube 120 may be made of any appropriate material, with a cross section that can handle high tension loads with a low amount of deflection. The tension cable/tube 120 may be any means that can carry a tension load such as a strap, string, rope, chain, belt, rod, beam, etc. The tension cable 120 extends from one mounting bracket 116 to the other mounting bracket 116. Disposed somewhere along the length of the tension cable, depending upon packaging requirements of the vehicle manufacturer, is a tension energy absorber 122. The tension energy absorber 122 may be of any configuration or design that can be laterally mounted between the mounting brackets 116 and capable of withstanding high tension loads. The tension energy absorber 122 should be relatively small in order to fit within the packaging constraints.

Figure 7:
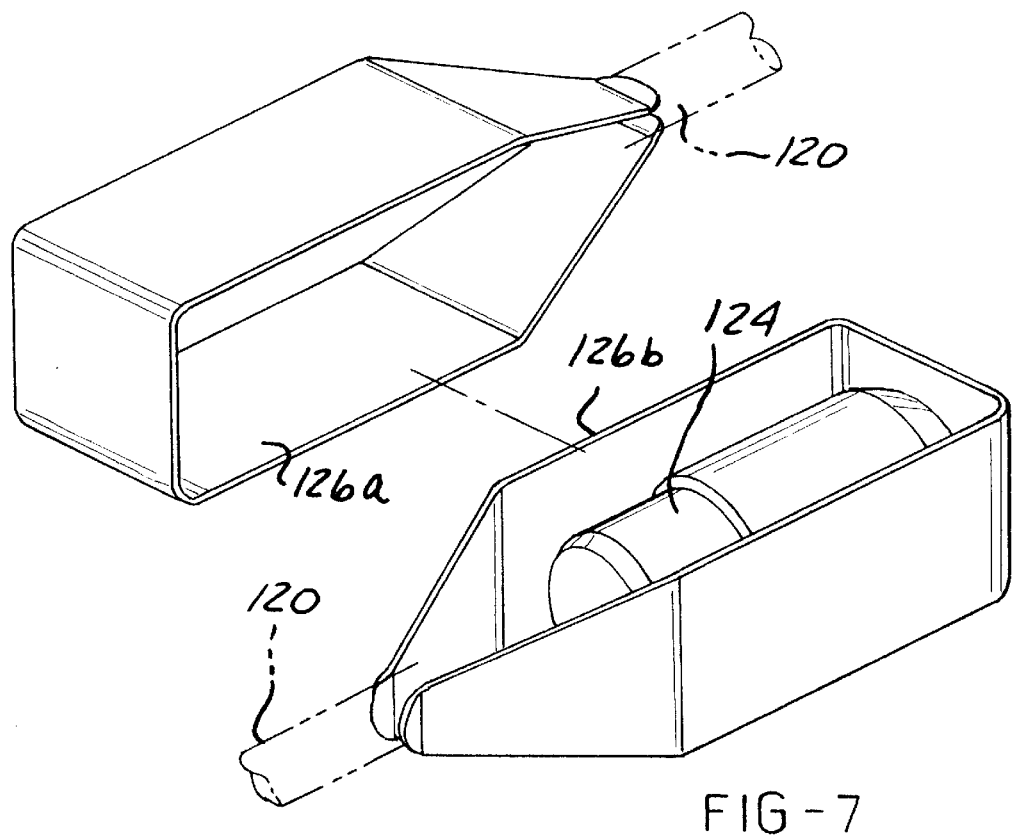
FIG. 7 is an exploded view of one version of a tension energy absorber for use in the second embodiment.
Figure 8:
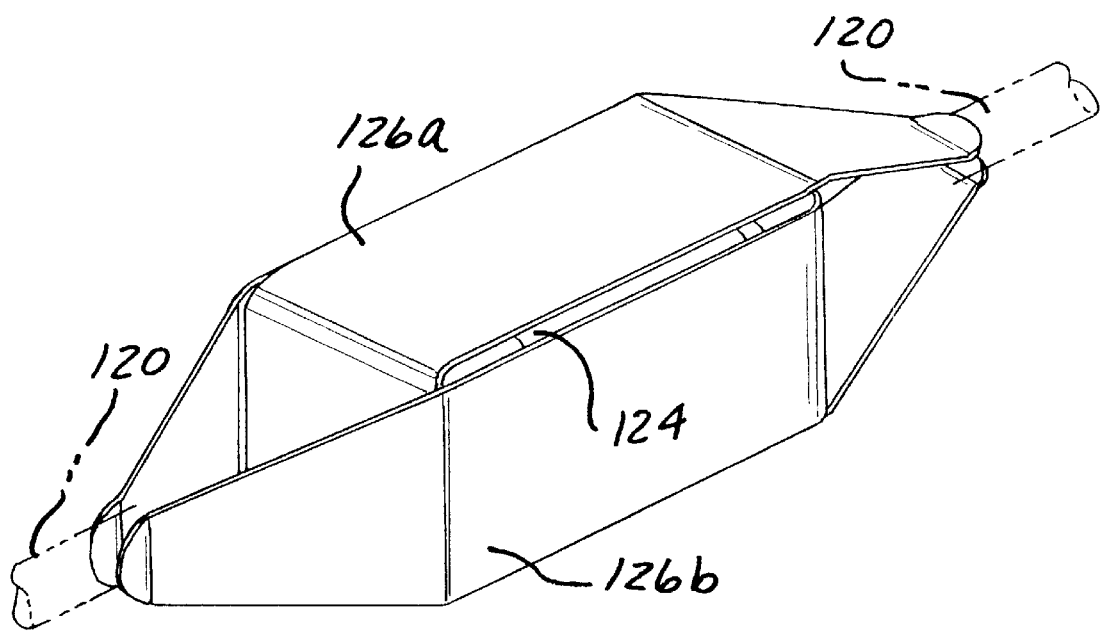
FIG. 8 is the tension energy absorber of FIG. 7 as assembled.

The tension energy absorber 122 may be one commercially available or one such tension energy absorber 122 as shown in FIGS. 7 and 8 wherein a typical commercially available compression shock absorber 124 is enclosed by a pair of overlaying tent-shaped metal sheeting 126a, b and connected to the tension cable 120 as shown in FIGS. 7 and 8 such that when the bumper beam 110 is impacted and the frame rails 114 are flexed outwardly thereby putting outward force on the tension cable 120. The enclosed compression shock absorber 124 is compressed to provide an adequate energy absorber to the tension cable 120 and bumper system. Other fabricating tension energy absorbers may be used.

Figure 9:
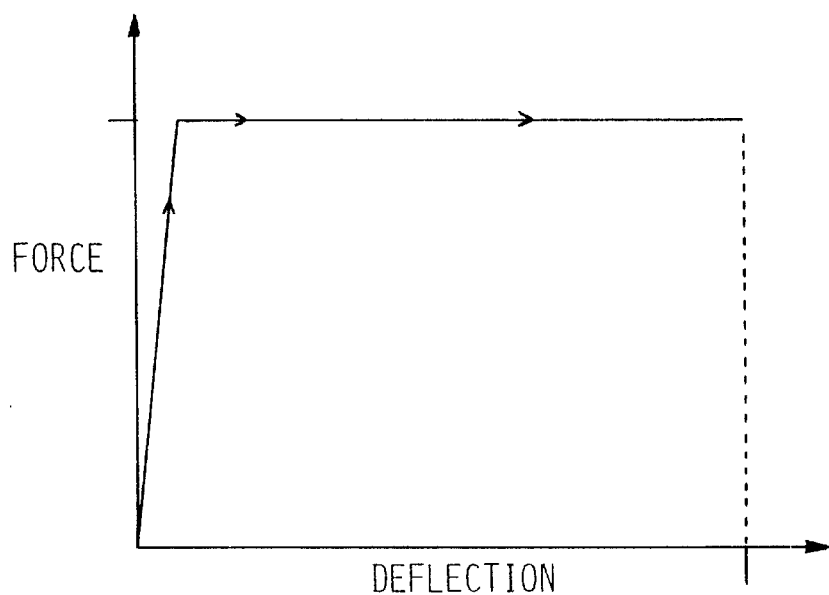
FIG. 9 is a schematic diagram of the deflection versus force requirements of the bumper beam assemblies.

FIG. 9 illustrates the desired bumper shock force versus deflection profile. It is desirable that the resultant bumper beam can withstand a force up to 70 KN and deflect with 15 mm compression or an 25 mm tension.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

We claim:

1. An energy impact bumper beam comprising:

a primary bumper having a curvature with an elongated configuration with lateral ends;

a secondary bumper having a curvature with a front wall and a pair of side end walls extending from the front wall for forming a pocket therebetween, said pocket configured to receive said primary bumper during impact of the bumper bean; and energy absorbers secured to the side end walls within the pocket of the secondary bumper, wherein said lateral ends of the primary bumper contact the energy absorbers and wherein the primary bumper and secondary bumper each have a sweep number defined by the curvature of the respective bumpers and the secondary bumper has a lower sweep number than the primary bumper.

2. The bumper beam of claim 1, wherein the energy impact bumper beam has at least one portion with a cross-section having a configuration selected from the group consisting of a W-section, a hat section, and a C-section.

3. The bumper beam of claim 1, wherein the energy absorbers are selected from the group consisting of an elastomeric compound, multiple sigma springs, coil springs, Y-spring set, and hydraulic dash pot.

4. The bumper beam of claim 1, wherein the primary beam slides in the pocket of the secondary beam upon impact.

5. The energy impact bumper of claim 1, wherein one of the energy absorbers is disposed between one of the lateral ends of the primary bumper and one of the side end walls of the secondary bumper.

6. The energy impact bumper of claim 1, wherein the secondary bumper further includes a top wall and a bottom wall extending from the front wall.

7. An energy impact bumper for a vehicle comprising:

a first bumper having a front wall securable to said vehicle and having a pair of side end walls attached to said front wall and extending away from the front wall to form a pocket therebetween, said first bumper having a radius of curvature;

a second bumper having a beam configuration with lateral ends, said second bumper having another radius of curvature wherein the second bumper has a smaller radius of curvature than the first bumper, when the energy impact bumper is in a non-impact position; and a pair of energy absorbers secured in the pocket, wherein one absorber is positioned at each side end wall, and wherein the pocket is configured to receive the second bumper between the pair of energy absorbers during impact of the energy impact bumper.

8. The energy impact bumper of claim 7, wherein the energy absorbers are selected from the group consisting of an elastomeric compound, multiple sigma springs, coil springs, Y-spring set and a hydraulic dash pot.

* * * * *